US007532720B2

(12) United States Patent
Montgomery

(10) Patent No.: US 7,532,720 B2
(45) Date of Patent: May 12, 2009

(54) UTILIZING SIMD INSTRUCTIONS WITHIN MONTGOMERY MULTIPLICATION

(75) Inventor: Peter L. Montgomery, San Rafael, CA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 10/686,316

(22) Filed: Oct. 15, 2003

(65) Prior Publication Data

US 2005/0084099 A1    Apr. 21, 2005

(51) Int. Cl.
*H04K 1/00* (2006.01)
*H04L 9/00* (2006.01)
*H04L 9/28* (2006.01)
*H04L 9/30* (2006.01)
*H04L 9/32* (2006.01)
*G06F 11/30* (2006.01)
*G06F 12/14* (2006.01)
*G06F 9/00* (2006.01)
*G06F 9/24* (2006.01)
*G06F 15/177* (2006.01)

(52) U.S. Cl. .................. 380/28; 380/29; 380/30; 713/1; 713/193; 713/174

(58) Field of Classification Search ................ 380/28, 380/29, 30; 713/1, 174, 193
See application file for complete search history.

(56) References Cited

U.S. PATENT DOCUMENTS 5,745,398 A * 4/1998 Monier ................. 708/492

6,202,077 B1 * 3/2001 Smith .................... 708/523
2002/0126838 A1 * 9/2002 Shimbo et al. ............ 380/28
2004/0015532 A1 * 1/2004 Ikeda et al. ............ 708/492

FOREIGN PATENT DOCUMENTS

WO       WO0176132      10/2001

OTHER PUBLICATIONS

Posch et al., "RNS-Modulo Reduction Upon a Restricted Base Value Set and its Applicability to RSA Cryptography", 1998, Computer &Security vol. 17, No. 7, pp. 637-650.*
Groszchadl et al., "Architectural Enhancement for Montgomery Multiplication on Embedded RISC Processors" Lecture Notes in Computer Science-Applied Cryptography and Network Security, vol. 2846, 2003, pp. 418-434, Retrieved from the Internet:www.springerlink.com/media.h4d4wlvwvq7r9elimv56/contributions/9/0/d/q/90dqk117ttj7xy4g.pdf.
Schwemmlein et al., "RNS-Modulo Reduction Upon a Restricted Base Value Set and its Applicability to RSA Cryptography", Computers & Securtiy, Elsevier Science Publishers. Amsterdam, NL, vol. 17, No. 7, 1998, pp. 637-650.
EPO Communication with Search Report dated Mar. 1, 2006, from counterpart EP patent application, European Patent Application No. 04 018 745.2, copy attached, 4 pages.

* cited by examiner

*Primary Examiner*—Shin-Hon Chen
(74) *Attorney, Agent, or Firm*—Lee & Hayes, PLLC

(57) ABSTRACT

An architecture and methodology for implementing Montgomery multiplication on a computer system that supports SIMD instructions is described.

13 Claims, 3 Drawing Sheets

UTILIZING SIMD INSTRUCTIONS WITHIN MONTGOMERY MULTIPLICATION

TECHNICAL FIELD

The invention relates to computer architectures that support SIMD (Single Instruction, Multiple Data) instructions.

BACKGROUND

Some computer architectures support execution of SIMD (Single Instruction, Multiple Data) instructions. Each such instruction performs one operation on multiple sets of data. During execution, multiple simultaneous instances of one operation are used to process different data. As an example, one instruction might perform several independent subtractions or other mathematical operations (but the same operation everywhere).

The Pentium® 4 microprocessor from Intel Corporation is one example of a computer architecture that is capable of executing SIMD instructions. The microprocessor utilizes 144 instructions, known as SSE2 (Streaming SIMD Extensions 2) instructions, to operate on data stored in registers. The microprocessor has eight 128-bit integer registers, each of which can hold multiple sets of data, such as two 64-bit integers, four 32-bit integers, eight 16-bit integers, or sixteen 8-bit integers. Each individual SSE2 instruction performs one operation on the multiple data sets contained in a register, possibly with inputs from another register. The SSE2 instructions reduce the overall number of instructions used to execute a particular program task, thereby increasing overall performance.

Today, microprocessors are called upon to perform many multiplication and division operations almost instantaneously. Security is one example where computers are called upon to perform many rigorous operations. Security functions employ complex cryptographic algorithms that often use exponentiation operations (e.g., the RSA algorithm) involving many modular multiplication and operations. It is a continuing goal to find ways to reduce computations in complex algorithms and thereby improve performance.

Montgomery multiplication is a well-known algorithm for modular multiplication which avoids division. It achieves this by reducing double-length products from the right rather than from the left.

SUMMARY

An architecture and methodology for implementing Montgomery multiplication on a computer system that supports SIMD instructions is described. In the described implementation, the machine-level operations utilized by Montgomery multiplication are performed using SSE2 (Streaming SIMD Extensions 2) instructions.

BRIEF DESCRIPTION OF THE CONTENTS

The same reference numbers are used throughout the disclosure to reference like elements and features.

DETAILED DESCRIPTION

Montgomery multiplication is a widely used, division-free, algorithm for modular multiplication. The following disclosure describes use of two-way SIMD (Single Instruction, Multiple Data) instructions within Montgomery multiplication. While Montgomery multiplication may be implemented on various computer architectures that support SIMD instructions, one particular implementation will be described in the context of a computer architecture that supports SIMD instructions operating on two independent operands.

Computer Architecture

Figure 1:
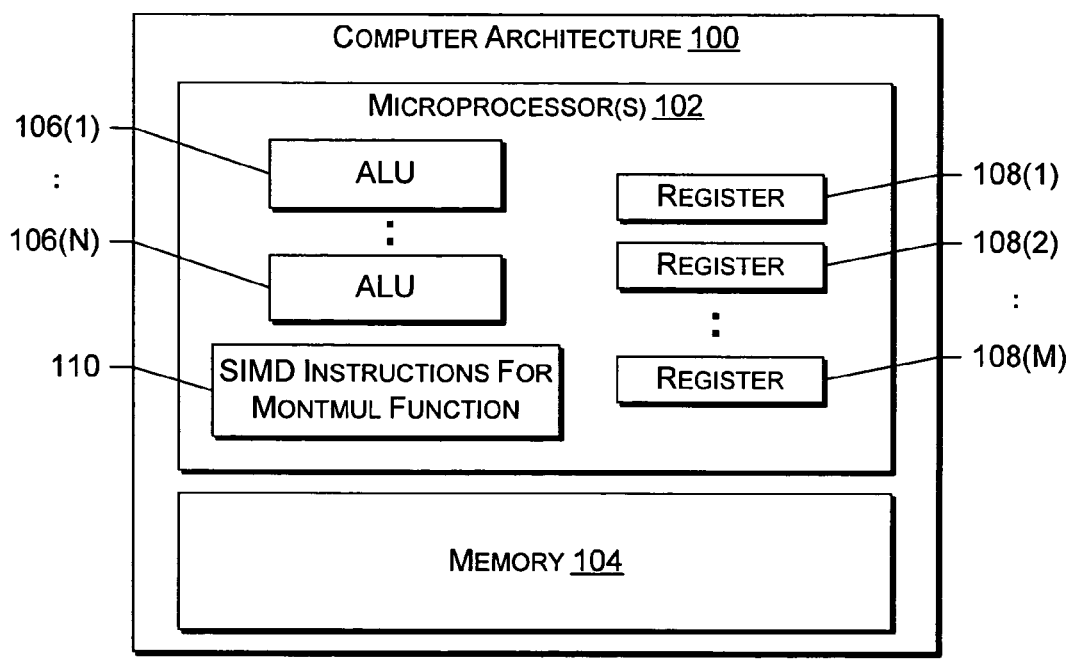
FIG. 1 illustrates a computer architecture that supports SIMD instructions.

FIG. 1 shows a computer architecture 100 that can be configured to implement use of two-way SIMD instructions for Montgomery multiplication. The computer architecture 100 includes a microprocessor 102 and memory 104. The microprocessor 102 has one or more ALUs (Arithmetic Logic Units) 106(1), . . . , 106(N) to manage mathematical operations, such as adding and multiplying, and logical operators like OR, AND, XOR, and so forth, as well as right and left shifts. The microprocessor 102 further includes one or more registers 108(1), . . . , 108(M) to hold intermediate values and final results produced by the ALUs 106.

One example of a microprocessor 102 is an Intel® IA-32 microprocessor, which has two ALUs 106 and eight 128-bit integer registers 108. The registers 108 are also known as XMM registers. Compilers from Intel Corporation and Microsoft Corporation support user access to these XMM registers without requiring the user to write assembly code.

The computer architecture 100 supports SIMD instructions. In our example, the Intel® IA-32 microprocessor supports SSE2 (Streaming SIMD Extensions 2) instructions. The SSE2 instruction set principally enhances audio and video compression processes, bringing several enhancements dedicated to boost MPEG 2 encoding and file encrypting processes. The SSE2 instruction set includes 144 instructions that support, among other things, 128-bit SIMD integer arithmetic operations. The SSE2 instructions are also intended to assist in vectorizing a program. If, for example, one is operating on 32-bit data, then each 128-bit XMM register can hold four 32-bit values. Using SSE2 instructions, these four 32-bit operands can be processed with a single instruction, and four-32-bit results obtained A sequence of SIMD instructions 110 is used to implement Montgomery multiplication, which is an algorithm for modular multiplication. The instructions are shown generally as residing in microprocessor 102, but they may be executed within any of ALUs 106(1)-106(N). These instructions direct the processor to perform computations involved in the Montgomery multiplication, perhaps during modular exponentiations in the cryptographic function.

Modular Multiplication and Montgomery Multiplication

By way of introduction to modular multiplication and Montgomery multiplication, consider a common division problem. Let $n_1$ and $n_2$ be integers with $n_2 > 0$. Dividing $n_1$ by $n_2$, the Euclidean division algorithm gives a unique integer quotient q and remainder r such that:

$$n_1 = qn_2 + r \ (0 \leq r \leq n_2).$$

For discussion purposes, the mathematical expressions "quo" and "rem" are defined as follows:

$$\text{quo}(n_1, n_2) = q \text{ (the quotient); and}$$

$$\text{rem}(n_1, n_2) = r \text{ (the remainder).}$$

The mathematical definition of modular multiplication starts with a positive integer modulus N, which is assumed to be fixed herein. Given two integers a and b, their modular product, modmul(a, b), is defined to be rem(ab, N). One possible implementation of modular multiplication is to first compute the product ab, then divide this product by N to yield a quotient q and a remainder r so that:

$$ab = qN + r \quad (0 \leq r < N) \tag{1a}$$

Such an algorithm outputs the remainder r=rem(ab, N)=modmul(a, b).

Observing that integer division was slow on many computer architectures, Peter Montgomery, the named inventor in this application, found another algorithm for modular multiplication (i.e., Montgomery multiplication) that avoids the divisions and is faster when performing extensive computations with a single modulus. For background information on the Montgomery algorithm for modular multiplication, the reader is directed to the following publications: Peter L. Montgomery, "Modular Multiplication without Trial Division", Mathematics of Computation, Volume 44, Number 170, April 1985, pp. 519-521; and Donald E. Knuth, "The Art of Computer Programming", Volume 2, "Seminumerical Algorithms", Third Edition, Springer-Verlag, 1998, exercise 4.3.1-41.

Montgomery multiplication requires a fixed integer R that is coprime to modulus N, meaning that the greatest common denominator of the fixed integer R and modulus N is one (i.e., gcd(N, R)=1). For ease of continuing discussion, it is assumed that the modulus N is odd and that the integer R is a power of 2 (except within an example which uses R=10). Given this assumption, there exists an integer N' with N N'≡1 (mod R). The value of N' depends only on N (and R), and need be computed only once per modulus N.

Given integers a and b (and with N, R known by context), the Montgomery product, montmul(a, b), is defined as the integer r' such that 0≤r'<N and $$ab \equiv r'R \pmod{N}. \tag{1b}$$

This integer r' exists (and is unique) because R is invertible modulo N. A formula for Montgomery multiplication follows:

$$\text{montmul}(a, b) = \text{rem}((ab - qN)/R, N), \text{ where } q = \text{rem}(ab \, N', R). \tag{M1}$$

To verify equation (M1), define $r_1 = (ab - qN)/R$, where $r_1$ is deemed to be an integer. That assertion follows from:

$$qN \equiv (ab \, N')N = ab(N' N) \equiv ab \pmod{R}.$$

Next, it is confirmed that r'=rem($r_1$, N) satisfies equation (1b), since:

$$r'R \equiv \text{rem}(r_1, N)R \equiv r_1 R = ab - qN \equiv ab \pmod{N}.$$

The integer r' also satisfies 0≤r'<N, by definition of "rem".

The right side of Montgomery's equation (M1) is easy to evaluate on a binary computer if R is a power of 2 and if R is large enough to force |ab−qN|<NR. The latter is ensured if 0≤a, b<N<R.

To see the usefulness of Montgomery product "montmul", define a function "tomont" for integers x, such that tomont(x)=rem(xR, N). Then, montmul(tomont(a), tomont(b)) R ≡ tomont(a)    // Definition of montmul
tomont(b)
≡ (aR)(bR) ≡ (abR)R ≡ tomont(ab)R (mod N).    // Definition of tomont The assumption gcd(N, R)=1 allows this congruence to be divided by R, leaving:

montmul(tomont(a), tomont(b))≡tomont(ab) (mod N).

The two sides must be equal since both are in the interval [0, N−1] and they are congruent modulo N. Knowing ab≡modmul(a, b) (mod N), and that tomont(x)=tomont(y) if x≡y (mod N), it is concluded that:

montmul(tomont(a), tomont(b))=tomont(ab)=tomont (modmul(a, b)).

Accordingly, the function "tomont" is a multiplicative homomorphism (meaning that images of products are products of images) from Z/NZ to Z/NZ if modmul is used to define multiplication on the domain and montmul to define multiplication on the image. Here Z/NZ denotes the integers modulo N. Further investigation reveals that, tomont(a)+tomont(b)≡tomont(a+b) (mod N)

tomont(a)−tomont(b)≡tomont(a−b) (mod N).

Therefore, the function "tomont" is a ring homomorphism (with the image of 1 being rem(R, N)). From, tomont(a)=tomont(b) if and only if a≡b (mod N)

the function "tomont" is a ring isomorphism from Z/NZ to Z/NZ, not only a homomorphism.

Multiple-Precision Montgomery Multiplication

Having introduced Montgomery multiplication, this section illustrates use of multiple-precision numbers in Montgomery multiplication. For discussion purposes, consider use of modular multiplication within a cryptographic function. The RSA cryptosystem, for example, requires modular exponentiation where the modulus might be 512 bits, 1024 bits, or longer. Most computer architectures support only 32×32→64-bit or 64×64→128-bit products. When multiplying longer numbers, each operand is partitioned into several smaller (typically 32-bit or 64-bit) pieces.

Let $r = 2^{32}$ or $2^{64}$, depending upon the computer word size. Find a positive integer k such that $r^k > N$ (usually one chooses k as small as possible subject to this constraint). Set $R = r^k$.

Upper case letters, such as A, are used in this discussion to represent nonnegative multiple-precision numbers below. Values up to N can be represented by k radix-r digits. These digits are written with the same letter followed by an index in brackets. If 0≤j≤k−1, then A[j] denotes the j-th digit of A in radix r (with the 0-th digit being the least significant). That is, $$A = \sum_{0 \leq j \leq k-1} A[j] \, r^j \quad 0 \leq A[j] \leq r-1$$

Another way to write this is A=(A[k−1] A[k−2] . . . A[0])$_r$, where the final subscript denotes the radix r.

Given these notations, one algorithm for montmul(A, B) where 0≤A, B<N<R is:

$T_1 := 0;$
$T_2 := 0;$
DISCARD := 0;
for j from 0 to k−1 do
    $\text{mul}_1 := A[j];$ -continued

```
T₁ := T₁ + mul₁ * B;           // Temporarily need k+1 digits
tlow := T₁[0];                 // tlow := rem(T₁, r)
T₁ := (T₁ - tlow)/r;           // T₁ := quo(T₁, r)
DISCARD := DISCARD +           // For presentation purposes only
   tlow * rʲ;
mul₂ := rem((tlow - T₂[0]) *   // So new T₂ will be an integer
   N'[0], r);
T₂ := (T₂ + mul₂ * N - tlow)/r;
end for;
return rem(T₁ - T₂, N);
```

Checking by induction, it is found that, at the end of the each iteration:

$$0 \leq T_1 < B$$
$$0 \leq T_2 < N$$
$$0 \leq \text{DISCARD} < r^{j+1}$$
$$T_1 \, r^{j+1} + \text{DISCARD} = (A[j] \, A[j-1] \ldots A[0])_r * B$$
$$T_2 \, r^{j+1} + \text{DISCARD} \equiv 0 \pmod{N}.$$

Two corollaries are:

$$-N < T_1 - T_2 < B$$

$$(T_1 - T_2) r^{j+1} \equiv (A[j] \, A[j-1] \ldots A[0])_r * B \pmod{N}.$$

After the last iteration (j=k−1) completes, the results are:

$$-N < T_1 - T_2 < B < N$$

$$(T_1 - T_2) R \equiv AB \pmod{N}.$$

Therefore, the function montmul(A, B) will be $T_1 - T_2$ (when $T_1 \geq T_2$) or $T_1 - T_2 + N$ (when $T_1 < T_2$).

With minor modifications, the updates to variables $T_1$ and $T_2$ can be made to look very similar. With a small change in the initializations of tlow and $mul_2$, the main loop becomes:

```
for j from 0 to k−1 do
    mul₁ := A[j];
    tlow := rem(T₁[0] + mul₁ * B[0], r);
    mul₂ := rem((tlow - T₂[0])* N'[0], r);
    T₁ := (T₁ + mul₁ * B - tlow)/r;
    T₂ := (T₂ + mul₂ * N - tlow)/r;
end for;
```

After this rewrite, the $T_1$ update adds a multiple of B whereas the $T_2$ update adds a multiple of N. The $T_1$, $T_2$, B, and N arrays represent multiple-precision numbers $\leq N < R = r^k$, in which all have length k when the numbers are written in radix r. The multipliers $mul_1$ and $mul_2$ are single precision (i.e., $0 \leq mul_1, mul_2 < r$). The instructions needed to update $T_1$ are very similar to those needed to update $T_2$. Thus, the sequence of instructions to update both $T_1$ and $T_2$ (taking into account that B and N are multiple-precision) is as follows:

[Update Code 1]

```
sum₁ := T₁[0] + mul₁*B[0];      // 0 ≤ sum₁ ≤ r² - r
                                // Use rem(sum₁, r) = tlow to
                                //   compute mul₂ (formula
                                //   suppressed here)
sum₂ := T₂[0] + mul₂*N[0];
sum₁ := quo(sum₁, r);           // 0 ≤ sum₁ ≤ r - 1
sum₂ := quo(sum₂, r);
for i from 1 to k −1 do
    sum₁ := sum₁ + T₁[i] + mul₁*B[i];   // 0 ≤ sum₁ ≤ r² - 1
    sum₂ := sum₂ + T₂[i] + mul₂*N[i];
    T₁[i−1] := rem(sum₁, r);
    T₂[i−1] := rem(sum₂, r);
    sum₁ := quo(sum₁, r);               // 0 ≤ sum₁ ≤ r - 1
    sum₂ := quo(sum₂, r);
end for;
T₁[k−1] := sum₁;
T₂[k−1] := sum₂;
```

Contemporary computer architectures support pipelining and instruction-level parallelism, in which an operation related to updating array $T_1$ is followed by an operation related to updating array $T_2$. To further improve performance, it is desirable to update arrays $T_1$ and $T_2$ together within the loop over i, using one instruction per pair of updates.

SIMD Instructions for Montgomery Multiplication

The computer architecture 100 illustrated in FIG. 1 employs SIMD instructions 110 (and in our particular example, SSE2 instructions) to update simultaneously the arrays $T_1$ and $T_2$ used in Montgomery multiplication, montmul(A, B). This process involves, in part, processing digits of A in a right-to-left manner and interleaving results of the multiplications involving B (i.e., $mul_1*B[i]$) and modulus N (i.e., $mul_2*N[i]$) that are used to update arrays $T_1$ and $T_2$. This will be described in more detail below.

As noted above, the SSE2 instructions assist in vectorizing a program, where multiple data sets can be held in a single register. To illustrate this point, for an operation involving 32-bit data, each 128-bit register 108 can hold four 32-bit values. A loop can then be written as follows:

```
int32 x[100], y[100], z[100];   // Assume int32 data type occupies 32 bits
for i from 0 to 99 do
    z[i] := x[i] + y[i];
end for;
```

This loop can be partially unrolled (by the programmer or the compiler) so the generated code resembles:

```
int32 x[100], y[100], z[100];
for i4 from 0 to 96 by 4 do
    z[i4] := x[i4] + y[i4];
    z[i4+1] := x[i4+1] + y[i4+1];
    z[i4+2] := x[i4+2] + y[i4+2];
    z[i4+3] := x[i4+3] + y[i4+3];
end for;
```

One SSE2 instruction loads four 32-bit data values (x[i4+3], x[i4+2], x[i4+1], x[i4]) from contiguous memory locations into an XMM register. Another SSE2 instruction loads (y[i4+3], y[i4+2], y[i4+1], y[i4]) to a different XMM register. A single PADDD instruction forms all four 32-bit sums, as follows:

$$(x[i4+3]+y[i4+3], x[i4+2]+y[i4+2], x[i4+1]+y[i4+1], x[i4]+y[i4]).$$

The four sums are then put into contiguous locations of the z array. By processing four array elements at a time, the number of loop iterations is reduced by a factor of four (from 100 to 25). Another effect is that the compiler can reserve four 32-bit registers to hold the loop index i4 and the array addresses x, y, z, rather than clutter those registers with data values such as x[i4].

Figure 2:
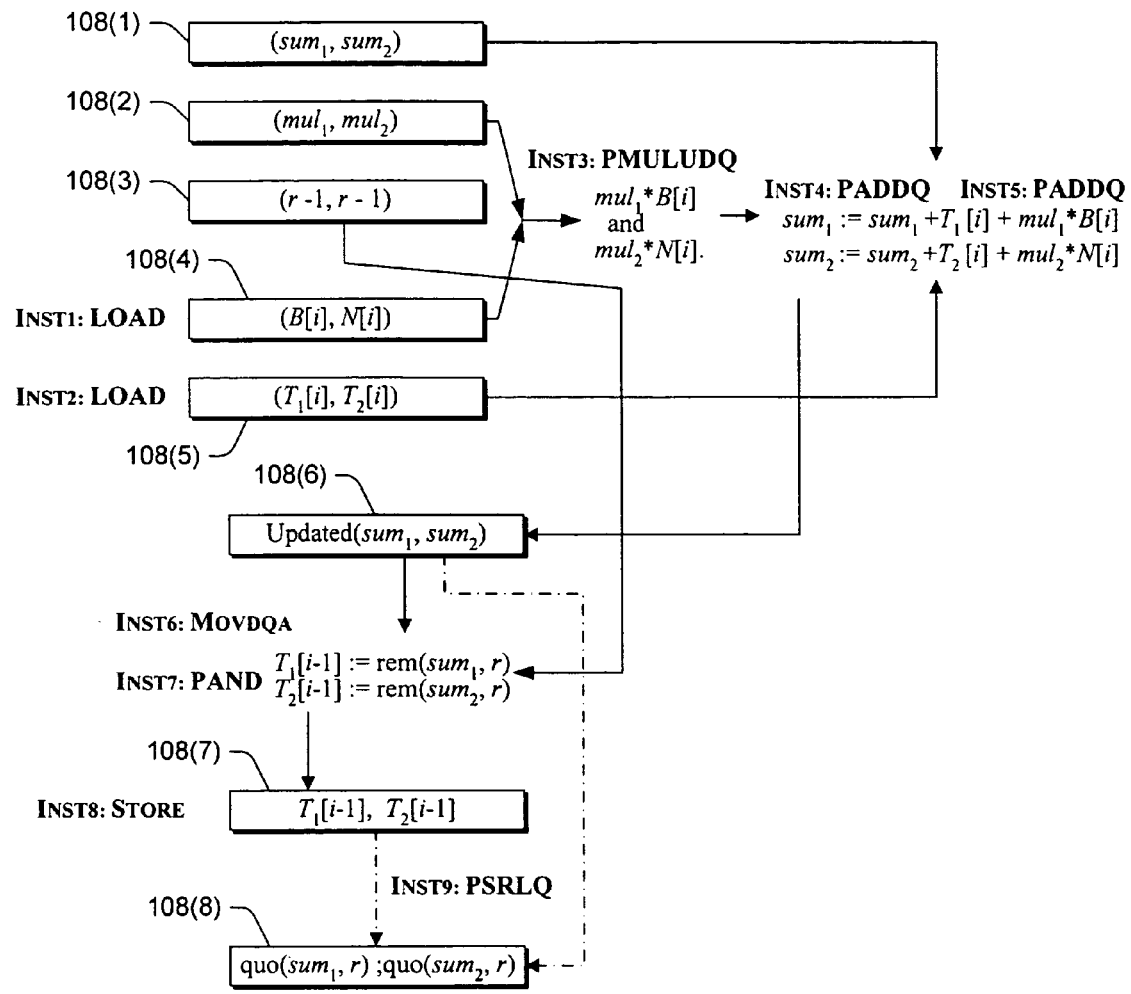
FIG. 2 illustrates use of SIMD instructions within Montgomery multiplication (which performs modular multiplication), and the placement of data values in registers.

In the case of Montgomery multiplication, the SSE2 instructions are employed to update arrays $T_1$ and $T_2$ together. Whereas in the last example, four 32-bit integer values are manipulated at once; here, SSE2 instructions are used to manipulate two 64-bit values. In the continuing example, assume that the radix $r=2^{32}$. The implementation will be described with reference to FIG. 2, which illustrates example registers and SSE2 commands.

Looking at the pseudocode [Update Code 1] noted above, the values of $sum_1$ and $sum_2$ are always in the interval [0, $r^2-1$]=[0, $2^{64}-1$]. One XMM register 108(1) is used to hold both 64-bit values ($sum_1$, $sum_2$). Other XMM registers 108(2), 108(4), and 108(5) (or memory locations) will hold the following pairs of 64-bit values:

$(mul_1, mul_2)$ $(B[i], N[i])$ $(0 \leq i \leq k-1)$ $(T_1[i], T_2[i])$ $(0 \leq i \leq k-1)$ Although the numerical values of $mul_1$, $mul_2$, B[i], N[i], $T_1[i]$, $T_2[i]$ all fit into 32 bits, 64 bits are allocated for each. A constant (r−1, r−1) is also employed, which is 00000000FFFFFFFF00000000FFFFFFFF in hexadecimal. This constant is held in register 108(3).

Once these data layouts are selected, the inner loop of the pseudocode [Update Code 1] translates easily. As noted, three of the eight XMM registers 108(1), 108(2), and 108(3) hold the pairs ($sum_1$, Sum2), ($mul_1$, $mul_2$), and (r−1,r−1). All three registers are initialized before starting the inner loop. The inner loop body loads the pairs (B[i], N[i]) and ($T_1[i]$, $T_2[i]$) into XMM registers 108(4) and 108(5), as represented by the two load instructions INST1: LOAD and INST2: LOAD in FIG. 2.

One SSE2 instruction "PMULUDQ", which multiplies two 32-bit values to produce a 64-bit unsigned product (i.e., 32×32→64-bit unsigned product), performs both operations $mul_1*B[i]$ and $mul_2*N[i]$ (i.e., INST3: PMULUDQ in FIG. 2). Two SSE2 instructions "PADDQ", which add two 64-bit values, are then used to yield:

$sum_1 := sum_1 + T_1[i] + mul_1 * B[i];$ $sum_2 := sum_2 + T_2[i] + mul_2 * N[i];$ with the updated ($sum_1$, $sum_2$) being placed in another XMM register 108(6) (i.e., INST4: PADDQ and INST5: PADDQ in FIG. 2). A copy operation (i.e., INST6: MOVDQA) makes a replica of ($sum_1$, $sum_2$). Then, one SSE2 instruction "PAND" (i.e., a 128-bit AND, which is the same as two 64-bit ANDs) with (r−1, r−1)) (i.e., INST7: PAND) and a store operation (i.e., INST8: STORE) perform the following functions:

$T_1[i-1] := rem(sum_1, r)$ $T_2[i-1] := rem(sum_2, r).$

The PAND destroys one copy of ($sum_1$, $sum_2$) but the other is preserved. Then, an SSE2 operation "PSRLQ" (i.e., right shift 64-bit data with zero fill) by 32 bits provides the following results (i.e., INST9: PSRLQ):

$sum_1 := quo(sum_1, r)$ $sum_2 := quo(sum_2, r).$

Excluding instructions for address computations and loop control (which use the 32-bit registers, not the XMM registers), the inner loop body needs only two loads, one multiply, two adds, one copy, one bitwise AND, one shift, one store—nine SSE2 instructions to update one element of array $T_1$ and the corresponding element of array $T_2$. The Microsoft Visual Studio NET and Intel® IA-32 compilers have intrinsics that allow a user to generate this type of code without using assembly language.

Notice that B[i] is processed in order from i=0 to i=k−1, allowing for right-to-left processing of the digits in A, which is the multiplier of array B. Each iteration of the loop over A reprocesses all of B. Also, notice that the multiplications $mul_1*B[i]$ can be interleaved with multiplications $mul_2*N[i]$ as i advances, resulting in a rearrangement of the computations. Yet, the process efficiently produces the desired final result, as will be illustrated below in more detail.

Memory Layout

The pseudocode [Update Code 1] shown above assumes B[i] and N[i] are in adjacent 64-bit words, since the SSE2 load instructions (MOVDQA) require the data being loaded to be contiguous in memory. This memory should also be aligned on a 16-byte boundary. But when montmul(A, B) is invoked, the inputs B[0] through B[k−1] will typically be in one array of contiguous 32-bit words (aligned on a 4-byte boundary) and N[0] through N[k−1] will be in another such array. That is not the memory pattern desired. Accordingly, the computer can be implemented to perform an additional loop initialization to create the desired array layout.

The problem is avoided by interleaving the B and N arrays into one temporary array with 128-bit elements (and properly aligned). The copies can be made early in montmul. The cost of these copies is negligible when k is large since each copied pair of elements will later be accessed k times.

Similarly, the elements of arrays $T_1$ and $T_2$ can be interleaved within an array with 128-bit elements. The final rem $(T_1-T_2, N)$ computation will store its output in standard form (i.e., adjacent 32-bit words).

Operation

Figure 3:
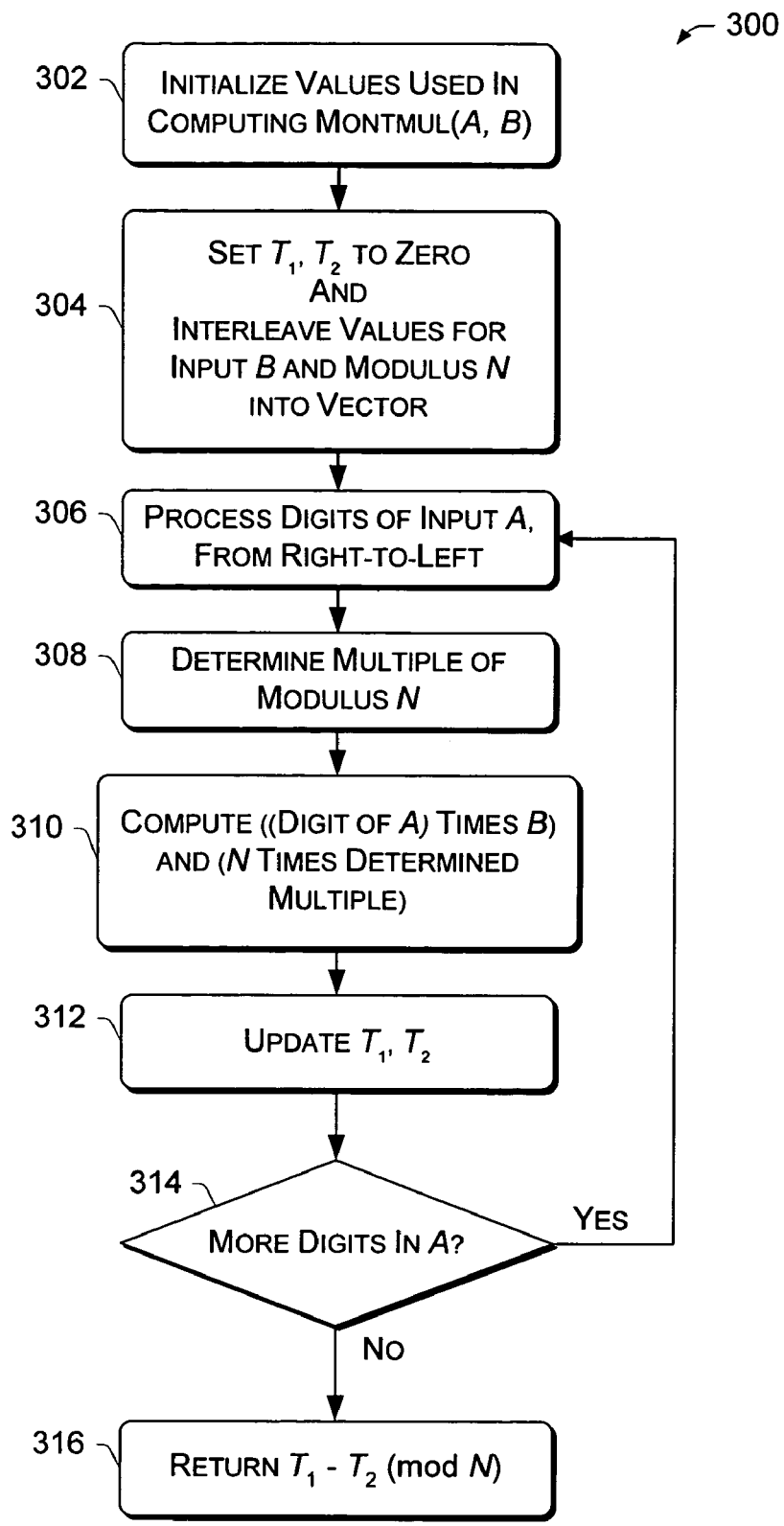
FIG. 3 is a flow diagram of a process for performing Montgomery multiplication on the computer architecture of FIG. 1.

FIG. 3 shows a process 300 for using SIMD instructions within Montgomery multiplication. The process 300 may be performed, for example, by computer architecture 100 and will be described with reference to both FIGS. 1 and 2. The process 300 is illustrated as a series of blocks, where each block represents an operation or functionality performed by the computer architecture. The operations or functions may be performed in software, firmware, and/or hardware. As such, the blocks may be used to represent instructions stored on a medium, that when executed, perform the recited functionality.

At block 302, the values used in computing the function montmul(A, B) are initialized. These values include integer inputs A, B, temporary arrays $T_1$, $T_2$, and modulus N. At block 304, temporary arrays $T_1$, $T_2$ are set to zero. Values for input B and modulus N are interleaved into a vector and a pair of elements from these arrays will fit in one of the registers (e.g., register 108(4) in FIG. 2).

At block 306 an iterative loop begins to process the digits of input A, from right-to-left. At block 308, assuming that array $T_1$ is to be updated with a multiple of input B (the multiplier $mul_1$ being a digit from array A), the processor determines what multiple $mul_2$ of modulus N allows the update arrays $T_1$, $T_2$ to end with the same digit(s). At block 310, the multiplication (digit of A) times B (i.e., $mul_1*B[i]$ in the pseudocode Update Code 1) and multiplication of the determined multiple times modulus N (i.e., $mul_2*N[i]$ in the pseudocode Update Code 1) are performed. At block 312, the arrays $T_1$, $T_2$ are updated. By using two arrays $T_1$ and $T_2$, the multiplication AB is interleaved with the multiplication qN in the Montgomery multiplication. The loop continues until all digits in input A have been processed, as represented by decision block 314. At block 316, the result $T_1-T_2$ (mod N) is returned.

Illustration of Loop Rearrangements Within Montmul Computation

An example of the Montgomery function montmul will now be described with realistic, but fictitious data. First, a desired answer to a montmul computation is derived, followed by a discussion of how this result is obtained using the technique described above.

Letting A=123 and B=456, the problem is to compute montmul(123, 456), with R=1000 (decimal) and N=789. By definition, the output will be an integer r' such that 0≦r'<789 and $$123*456 \equiv 1000r' \pmod{789}.$$

Solving N N'≡1 (mod R), an integer N' is found to be 109 (i.e., 789 N'≡1 (mod 1000), yields N'=109). If the modulus N=789 has been used before, the relationship 789 N'≡1 (mod 1000) can be solved once to obtain N'=109. To check the result, plug N'=109 into the relationship, 789*109=86001, which mod R=1000 ends in 001. It is noted that, if this is the first use of the modulus 789, the extended Euclidean algorithm can be used.

Next, using the Montgomery multiplication function [M1] derived above (i.e., montmul(A, B)=rem((AB−qN)/R, N), where q=rem(AB N', R)), the product AB is computed to produce 56,088 (i.e., 123*456=56,088). A leading zero is inserted (i.e., 056088) to form six digits in order to hold the product of two three-digit numbers. At modulo R=1000, the last three digits in the result are 088. To find quotient q, the result 088 is multiplied by the integer N'=109 to produce 9592 (i.e., 088*109=9592). Once again, at modulo R=1000, the bottom three digits of this result are 592 (i.e., q=592). Multiplying the quotient q=592 with the modulus N=789, and subtracting from the product of 123*456 (i.e., AB−qN) provides:

$$056088-592*789=056088-467088=-411000.$$

By construction, this result ends in 000. Dividing the value −411000 by R (i.e., forming the first element in the "rem" function (AB−qN)/R), the final result is −411. Inserting these results back into the Montgomery function montmul yields the final desired answer:

$$montmul(123, 456)=rem(-411, 789)=378.$$

With the desired answer as reference, the remaining portion of this section uses the example values in the multiple-precision implementation described above using SIMD instructions. The multiple-precision version in this exposition (with r=10 and k=3) aims to thrice insert one zero digit at the bottom of the remainder, rather than insert all three zeros at once. It does this, in part, by processing digits in input A from right-to-left, beginning with the ones' digit and ending with the hundreds' digit.

With N'=109, its low-order digit is N'[0]=9. The low order digit of the product AB, or 056088, is 8. The product 056088*N' therefore ends in the same digit as 8*9=72. The last digit is a 2, so subtract twice the modulus N (i.e., 789) from the product AB (i.e., 056088):

$$056088-2*789=056088-1578=054510.$$

The next step looks at the tens' digit 1 in the resulting value 054510. The product 05451*N' (after suppressing the trailing zero) ends in the same digit as 1*9=9. Thus, a decision is made to subtract nine times the modulus N (i.e., 789), with one trailing zero placeholder to ensure treatment of the tens' digit (i.e., 7890), from the result 054510 yields:

$$054510-9*7890=054510-71010=016500.$$

Repeating this step one more time for the hundreds' digit 5 in the result, the product −0165*N' (suppressing the two trailing zeros) ends in the same digit as 5*9=45, which has a last digit of 5. Subtracting five times the modulus N (i.e., 789), with two trailing zero placeholders (i.e., 78900), from the result −016500 yields:

$$-016500-5*78900=-016500-394500=-411000.$$

As earlier, the output is montmul(123, 456)=rem(−411, 789)=378. Here, we subtracted 2*789, 9*7890, and 5*78900 from 056088, giving the same outcome as when we earlier subtracted 592*789 from 056088.

By using two temporary arrays, $T_1$ and $T_2$, the multiplication AB (i.e., 123*456=056088) can be interleaved with the reduction AB−qN (i.e., 056088−592*789) to obtain the result −411000. Multiples of 456 will be added to array $T_1$ for computing the multiplication AB while multiples of 789 will be added to array $T_2$ for computing the reduction of qN. Both $T_1$ and $T_2$ will remain nonnegative. Initializing $T_1=T_2=0$, the multiplication AB, or 123*456, begins at the lower digit of 123, or 3:

$$T_1 = T_1 + 3*456 = 0 + 1368 = 1368$$

The present $T_2=0$ ends in a zero. In order for array $T_2$ to end in an 8 like the present last digit of array $T_2=1368$, it is determined to multiply the modulus N (i.e., 789) by the factor of 2 (i.e., 2*9=18, which ends in an 8, which when added to 0 equals 8):

$$T_2 = T_2 + 2*789 = 0 + 1578 = 1578.$$

Discard the trailing 8's digit in both arrays $T_1$ and $T_2$ (i.e., DISCARD=8 for the loop invariants), leaving:

$$T_1=136 \; T_2=157.$$

The next digit in A=123 (working from the right) is a 2.

$$T_1 = T_1 + 2*456 = 136 + 912 = 1048.$$

The present $T_2=157$ ends in a 7. In order for array $T_2$ to end in an 8 like the present last digit of array $T_1=1048$, it is determined to multiply the modulus N (i.e., 789) by the factor of 9 (i.e., 9*9=81, which ends in a 1, which when added to 7 equals 8):

$$T_2 = T_2 + 9*789 = 157 + 7101 = 7258$$

Discarding the trailing 8's digit in both arrays $T_1$ and $T_2$ (i.e., DISCARD=88 for the loop invariants) leaves:

$$T_1=104 \; T_2=725.$$

The last digit in A=123 (working from the right) is a 1:

$$T_1 = T_1 + 1*456 = 104 + 456 = 560.$$

The last digit in the present array $T_2=725$ is a 5. In order for array $T_2$ to end in a 0 like the present last digit of array $T_1=560$, it is determined to multiply the modulus N (i.e., 789) by the factor of 5 (i.e., 5*9=45, which ends in a 5, which when added to 5 equals ends in a zero):

$$T_2 = T_2 + 5*789 = 725 + 3945 = 4670.$$

Discard the trailing 0's digit in both arrays $T_1$ and $T_2$ (i.e., DISCARD=088 for the loop invariants), leaves:

$$T_1=56 \; T_2=467.$$

Observe that $T_1=56$ has the leading digits of $123*456=56088$ whereas $T_2=467$ has the leading digits of $592*789=467088$. The shared bottom digits are in DISCARD=088. The output is:

montmul(123, 456)=rem(56–467, 789)=rem(–411, 789)=378.

It is noted that although the computations have been rearranged, the process produced the same final result. Six summands were added in a different order:

|  |  |
|---|---|
| 003 * 456 = | 001368 |
| 020 * 456 = | 009120 |
| 100 * 456 = | 045600 |
| –002 * 789 = | –001578 |
| –090 * 789 = | –071010 |
| –500 * 789 = | –394500 |
|  | –411000 |

With the computer architecture 100 described above, and use of SIMD instructions, the arrays $T_1$ and $T_2$ are updated together. For example, it can simultaneously perform both:

$$T_1 = 136 + 2*456 = 1048$$

$$T_2 = 157 + 9*789 = 7258.$$

Start by looking at the bottom (i.e., units) digits of the $T_1$ update: $6+2*6=18$. This ends in an 8 whereas 157 ends in a 7, so the multiplier of 789 in the $T_2$ update will be $(8-7)N'[0] \equiv 9$ (mod 10). Once this multiplier is determined, the bottom digits of the $T_2$ update are found to be $7+9*9=88$. Discard the (shared) trailing 8's in 18 and 88, initializing a carries vector to the high digits (1, 8).

Proceeding through the $T_1$ and $T_2$ updates, but doing them together using SAID instructions, the next step operates on the tens' digits (subscript 1) of the inputs:

$$\text{temp} = \text{carries} + (T_1[1], T_2[1]) + (2, 9) * (B[1], N[1])$$

$$= (1, 8) + (3, 5) + (2, 9) * (5, 8)$$

$$= (14, 85).$$

The two elements of temp are integers from 0 to 99. The bottom digits (4, 5) are saved as the new values of ($T_1[0]$, $T_2[0]$) and the upper digits are placed in the carries vector (i.e., carries=(1, 8)), which by chance is the same as the old value of the carries vector.

Doing likewise on the hundreds' digits.

$$\text{temp} = \text{carries} + (T_1[2], T_2[2]) + (2, 9) * (B[2], N[2])$$

$$= (1, 8) + (1, 1) + (2, 9) * (4, 7)$$

$$= (10, 72).$$

The bottom digits (0, 2) are saved as the new values of ($T_1[1]$, $T_2[1]$) and the upper digits are placed in the carries vector (i.e., carries=(1, 7)).

We have exhausted all digits in the input A=123. The contents of the carries vector (i.e., carries=(1, 7)) are stored as the new values of ($T_1[2]$, $T_2[2]$). The new values (with the final 8's already discarded) are $T_1=104$ and $T_2=725$.

The inputs to the temp computation are integers from 0 to 9 and the output ranges from 0 to 99. For the hardware registers 108, this corresponds to inputs of 0 to $2^{32}-1$ and outputs of 0 to $2^{64}-1$. When ($T_1[2]$, $T_2[2]$) is referenced from memory, the operands are in adjacent locations, as this is how they were stored on a previous iteration. More precisely, they are stored as adjacent 64-bit locations, even though their values fit into 32 bits. Pairs like (B[2], N[2]) are copied to adjacent locations early, and reused as each digit of A=123 is processed.

EXAMPLE SOURCE CODE

Example source code for implementing the pseudocode [Update Code 1] is provided below.

Some macros are referenced within this code but not defined here. ptr_roundup_m128i(temps) takes a temporary array address aligned on a 4-byte boundary, and returns whichever of temps, temps+4, temps+8, temps+12 is aligned on a 16-byte boundary. Given a 128-bit value x, the SSE2_digit2(x) macro returns the value in bits 63-32 of x, and the SSE2_digit0(x) macro returns the value in bits 31-0 of x.

digit_t, digit_tc, DWORDREG, DWORDREGC are all 32-bit types. The trailing "c" or "C" identifies a constant operand.

Some variable correspondences are:

| Text | modmul_from_right_SSE2 |
|---|---|
| A, B | b, a |
| N | modulus |
| N'[0] | minv |
| k | lng |
| (B[i], N[i]) | a_modulus[i] |
| ($T_1[i]$, $T_2[i]$) | temp12[i] |
| ($2^{32}-1$, $2^{32}-1$) | mask02 |
| ($\text{mul}_1$, $\text{mul}_2$) | mul12 |
| ($\text{sum}_1$, $\text{sum}_2$) | prod12 or carry12 |

The computation of $\text{mul}_2$, the multiple of N to be added to $T_2$, would normally resemble:

$$\text{mul}_2 = (T_1[0] + \text{mul}_1 * B[0] - T_2[0]) * N' \pmod{r}.$$

This formulation requires the multiplication $\text{mul}_1 * B[0]$ to finish before the multiplication by N' can begin. The source code instead uses:

$$\text{mul}_2 = (T_1[0] - T_2[0]) * N' + \text{mul}_1 * (B[0] * N') \pmod{r}$$

with $B[0]*N' \pmod{r}$ precomputed. The revised $\text{mul}_2$ formula allows the two integer multiplications to overlap, if the hardware pipelines such computations.

---

This is the first of several modmulchx files with algorithms for modular multiplication, both FROM_LEFT and FROM_RIGHT. All procedures have an argument list

```
                (digit_tc *a, *b,           // Two numbers to multiply
                                            // 0 <= a, b < modulus
                digit_t   *c                // Product. May overlap a or b.
                mp_modulus_tc *pmodulo,     // Struct with information about modulus
                digit_t   *temps)           // Temporaries (length
                                            //     pmodulo->modmul_algorithm_temps)
            FROM_LEFT codes return
                    c == (a*b) mod modulus
            FROM_RIGHT codes return the Montgomery product
                    c == a*b / RADIX^lng (mod pmodulo->modulus).
        where lng = pmodulo->length.
            This file starts with
                modmul_from_left_default
                modmul_from_right_default
        which work on all architectures and lengths. It also has
                modmul_from_right_SSE2
        which is specific to X86 hosts with SSE2 instructions (e.g., Pentium 4).
*/
/***************************************************************************/
static BOOL WINAPI modmul_from_left_default
        (digit_tc *a,                // IN
        digit_tc *b,                 // IN
        digit_t   *c,                // OUT
        mp_modulus_tc *pmodulo,      // IN
        digit_t *temps)              // TEMPORARIES, at least 2*lng
/*
        This implements ordinary modular multiplication.
    Given inputs a, b with 0 <= a, b < modulus < RADIX^lng,
    and where lng > 0, we form
            c == (a*b) mod modulus.
*/
{
    BOOL OK = TRUE;
    DWORDREGC lng = pmodulo->length;
    digit_t *temp1 = temps;          // Length 2*lng
    assert (pmodulo->modmul_algorithm_temps == 2*lng);
    OK = OK &&multiply(a, lng, b, lng, temp1);       // Double-length product
    OK = OK &÷(temp1, 2*lng, pmodulo->modulus, lng,
                    &pmodulo->left_reciprocal_1, digit_NULL, c);
    return OK;
}   // modmul_from_left_default
/***************************************************************************/
static BOOL WINAPI modmul_from_right_default
        (digit_tc *a,                // IN
        digit_tc *b,                 // IN
        digit_t   *c,                // OUT
        mp_modulus_tc *pmodulo,      // IN
        digit_t   *temps)            // TEMPORARIES, at least 2*lng
/*
        This implements Montgomery (FROM_RIGHT) multiplication.
    Let lng = pmodulo->length > 0.
    Given inputs a, b with 0 <= a, b < pmodulo->modulus < RADIX^lng, we form
            c == a*b / RADIX^lng (mod pmodulo->modulus).
        At the start of the loop on i, there exists templow
    (formed by the discarded values of
    LOW_DIGIT(prod1) = LOW_DIGIT(prod2)) such that
            0 <= temp1, temp2 < modulus
            temp1*RADIX^j + templow = b[0:j-1] * a
            temp2*RADIX^j + templow == 0 (mod modulus)
    When j = lng, we exit with c == temp1 - temp2 (mod modulus)
*/
{
    BOOL OK = TRUE;
    DWORDREGC lng = pmodulo->length;
    digit_t *temp1 = temps, *temp2 = temps + lng;     // Both length lng
    digit_tc *modulus = pmodulo->modulus;
    digit_tc minv = pmodulo->right_reciprocal_1;
    digit_tc minva0 = minv*a[0];     // mod RADIX
    DWORDREG i, j;
    digit_t carry1, carry2, mul1, mul2;
    dblint_t prod1, prod2;
    assert (pmodulo->modmul_algorithm_temps == 2*lng);
// Case j = 0 of main loop, with temp1 = temp2 = 0 beforehand.
    mul1 = b[0];
    mul2 = minva0*mul1;      // Modulo RADIX
    carry1 = HPRODUU(mul1,    a[0]);             // Top of product
    carry2 = HPRODUU(mul2, modulus[0]);
    assert (mul1*a[0] == mul2*modulus[0]);       // mod RADIX
    for (i = 1; i != lng; i++) {
```

```
                prod1 = MULTIPLY_ADD1(mul1,        a[i], carry1);
                prod2 = MULTIPLY_ADD1(mul2, modulus[i], carry2);
                temp1[i−1] = LOW_DIGIT(prod1);
                temp2[i−1] = LOW_DIGIT(prod2);
                carry1 = HIGH_DIGIT(prod1);
                carry2 = HIGH_DIGIT(prod2);
        }
        temp1[lng−1] = carry1;
        temp2[lng−1] = carry2;
        for (j = 1; j != lng; j++) {
            mul1 = b[j];
            mul2 = minva0*mul1 + minv*(temp1[0] − temp2[0]);   // Modulo RADIX
            prod1 = MULTIPLY_ADD1(mul1, a[0], temp1[0]);
            prod2 = MULTIPLY_ADD1(mul2, modulus[0], temp2[0]);
            // Replace temp1 by (temp1 + b[j]*a − LOW_DIGIT(prod1))/RADIX
            // Replace temp2 by (temp2 + mul2*modulus − LOW_DIGIT(prod2))/RADIX
            assert (LOW_DIGIT(prod1) == LOW_DIGIT(prod2));
            carry1 = HIGH_DIGIT(prod1);
            carry2 = HIGH_DIGIT(prod2);
            for (i = 1; i != lng; i++) {
                prod1 = MULTIPLY_ADD2(mul1,        a[i], temp1[i], carry1);
                prod2 = MULTIPLY_ADD2(mul2, modulus[i], temp2[i], carry2);
                temp1[i−1] = LOW_DIGIT(prod1);
                temp2[i−1] = LOW_DIGIT(prod2);
                carry1 = HIGH_DIGIT(prod1);
                carry2 = HIGH_DIGIT(prod2);
            }
            temp1[lng−1] = carry1;
            temp2[lng−1] = carry2;
        }
        OK = OK &&sub_mod(temp1, temp2, c, modulus, lng);
        return OK;
} // modmul_from_right_default;
/*****************************************************************************/
#if TARGET == TARGET_IX86 &&USESSE2
static BOOL WINAPI modmul_from_right_SSE2
            (digit_tc *a,                  // IN
             digit_tc *b,                  // IN
             digit_t   *c,                 // OUT
             mp_modulus_tc *pmodulo,       // IN
             digit_t   *temps)             // TEMPORARIES, at least 8*lng + 3
/*
        With modmul_from_right_default (above), the computations on
    (a, carry1, mul1, prod1, temp1) are very similar to those on
    (modulus, carry2, mul2, prod2, temp2).
    This module takes advantage thereof, using X86 SSE2 instructions.
        The last code often fetches a[i] and modulus[i] together.
    We construct one temporary array with lng 128-bit words (hence 4*lng digit_t
    elements), whose i-th element contains (0, a[i], 0, modulus[i]).
    Another array of this length has (0, temp1[i], 0, temp2[i]).
*/
{
    BOOL OK = TRUE;
    DWORDREGC lng = pmodulo->length;
    digit_tc *modulus = pmodulo->modulus;
    digit_tc minv = pmodulo->right_reciprocal_1;
    digit_tc minva0 = minv*a[0];       // mod RADIX
    const __m128i mask02 = _mm_set_epi32(0, RADIXM1, 0, RADIXM1);
    __m128i *temp12 = ptr_roundup_m128i(temps);   // Length lng
    __m128i *a_modulus = temp12 + lng;            // Length lng
    __m128i carry12, mul12, prod12;
    DWORDREG i, j;
    assert (pmodulo->modmul_algorithm_temps == 8*lng + 3);
    for (i = 0; i != lng; i++) {
        a_modulus[i] = _mm_set_epi32(0, a[i], 0, modulus[i]);
        temp12[i] = _mm_setzero_si128();
    }
    for (j = 0; j != lng; j++) {
        digit_tc mul1 = b[j];
        digit_tc mul2 = minva0*mul1
                + minv*(SSE2_digit2(temp12[0]) − SSE2_digit0(temp12[0]));
                                                        // Modulo RADIX
        mul12 = _mm_set_epi32(0, mul1, 0, mul2);
        prod12 = _mm_add_epi64(temp12[0], _mm_mul_epu32(mul12, a_modulus[0]));
        // Replace temp1 by (temp1 + b[j]*a − LOW_DIGIT(prod1))/RADIX
        // Replace temp2 by (temp2 + mul2*modulus − LOW_DIGIT(prod2))/RADIX
        assert (SSE2_digit0(prod12) == SSE2_digit2(prod12));
        carry12 = _mm_srli_epi64(prod12, 32);
            // Upper halves of products: (0, carry1, 0, carry2)
```

-continued

```
        for (i = 1; i != lng; i++) {
            prod12 = _mm_add_epi64(_mm_add_epi64(carry12, temp12[i]),
                                    _mm_mul_epu32(mul12, a_modulus[i]));
            temp12[i-1] = _mm_and_sil28(mask02, prod12);   // Lower halves
            carry12 = _mm_srli_epi64(prod12, 32);          // Upper halves
        }
        temp12[lng-1] = carry12;
    } //for j
//      Do the equivalent of sub_same, but with non-contiguous input.
    {
        digit_t borrow = 0;
        for (i = 0; i != lng; i++) {
            digit_tc ai = SSE2_digit2(temp12[i]);
            digit_tc bi = SSE2_digit0(temp12[i]);
            digit_tc ci = ai - bi - borrow;
            c[i] = ci;
            borrow = ai ^ ((ai ^ bi) | (ai ^ ci)); // MAJORITY(~ai, bi, ci)
            borrow >>= (RADIX_BITS - 1);
        }
        if (borrow != 0) borrow -= add_same(c, modulus, c, lng);
        assert (borrow == 0);
    }
    return OK;
} // modmul_from_right_SSE2
#endif // TARGET_IX86
```

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A processing system comprising:
a processor having a set of registers; and
the processor executes a set of SIMD instruction to perform Montgomery multiplication:

montmul($A$, $B$)=rem(($AB-qN$)/$R$, $N$), where q=rem($AB$ $N'$, $R$;

where A and B are integers, q is a quotient, N is a modulus, R is an integer that is coprime to modulus N, and N' is an integer such that $NN'\equiv 1$ (mod R), wherein the integer B and the modulus N are implemented as arrays, and at least one SIMD instruction is used to update a first array $T_1$ with multiples of B for computing AB and to update a second array $T_2$ with multiples of N for computing qN, wherein a first register holds elements of the B and N arrays;
a second register holds an element of the first array $T_1$ and an element of the second array $T_2$; and
a third register is used to hold results of the first array $T_1$ being updated with a multiple of B and the second array $T_2$ being updated with multiples of N.

2. A processing system as recited in claim 1, wherein the processor executes a cryptographic function and the Montgomery multiplication is used to compute exponentiations in the cryptographic function.

3. A processing system as recited in claim 1, wherein the SIMD instructions comprise a single SIMD instruction that simultaneously performs parts of the multiplications AB and qN.

4. A processing system as recited in claim 1, wherein a single SIMD instruction is used to update the first array $T_1$ and the second array $T_2$ simultaneously.

5. A computer readable storage medium comprising computer-executable SIMD instructions that, when executed, direct a processor to perform Montgomery multiplication, the instructions comprising:
a first SIMD instruction to load elements of array B and N into a first register;
a second SIMD instruction to load elements of arrays $T_1$ and $T_2$ into a second register;
a third SIMD instruction to multiple an element in the array B by a first multiple and an element in the array N by a second multiple;
fourth and fifth SIMD instructions to add results of the third SIMD instruction to the array elements loaded by the second SIMD instruction and to any carries saved from a previous iteration;
sixth and seventh SIMD instructions to separate each output of the fifth SIMD instruction into two reduced size results, one that fits into the arrays $T_1$ and $T_2$ and another that represents a carry for a next iteration;
an eighth SIMD instruction to update an element of array $T_1$ and an element of array $T_2$ in memory; and an instruction to store the result of the final iteration.

6. A computer readable storage medium as recited in claim 5, wherein the SIMD instructions comprise SSE2 instructions.

7. A method for computing Montgomery multiplication, whereby Montgomery multiplication is performed within a cryptographic function in a computer, the method comprising:

montmul($A$, $B$)=r rem( ($AB-qN$)/$R$, $N$), where q=rem ($AB$ $N'$, $R$):

where A and B are integers, q is a quotient, N is a modulus, R is an integer that is coprime to modulus N, and N' is an integer such that $N N'\equiv 1$ (mod R), the method comprising:
iteratively performing, for each digit of integer A from right to left:
with array $T_1$ being updated by a product of input B times the digit of integer A, determining what multiple of modulus N allows the updated arrays $T_1$, $T_2$ to end with the same digit;

multiplying the input B by the digit of integer A and multiplying the modulus N by the determined multiple; and updating the arrays $T_1$, $T_2$ storing the result of the final iteration.

8. A method as recited in claim 7, wherein the performing comprises using SIMD instructions.

9. A method as recited in claim 7, wherein the multiplying is performed by a single SIMD instruction.

10. A method as recited in claim 7, further comprising initializing the arrays $T_1$, $T_2$ and the modulus N prior to said performing.

11. One or more computer readable storage media storing computer executable instructions that, when executed by a computer, perform the method as recited in claim 7.

12. A method as recited in claim 7, wherein the computing comprises using the Montgomery multiplication to compute exponentiations in a cryptographic function.

13. A method as recited in claim 7, wherein the computing comprises using SSE2 instructions.

* * * * *